(12) United States Patent
Ou

(10) Patent No.: US 9,154,069 B2
(45) Date of Patent: Oct. 6, 2015

(54) INTEGRATED GENERATION CONTROL SYSTEM

(75) Inventor: Ting-Chia Ou, Taoyuan County (TW)

(73) Assignee: INSTITUTE OF NUCLEAR ENERGY RESEARCH ATOMIC ENERGY COUNCIL, Executive Yuan, R.O.C., Lungtan, Taoyuan (TW)

( * ) Notice: Subject to any disclaimer, the term of this patent is extended or adjusted under 35 U.S.C. 154(b) by 849 days.

(21) Appl. No.: 13/437,180

(22) Filed: Apr. 2, 2012

(65) Prior Publication Data

US 2013/0257347 A1    Oct. 3, 2013

(51) Int. Cl.
  H02P 11/00    (2006.01)
  H02P 9/10     (2006.01)
  H02J 3/24     (2006.01)
  H02J 7/32     (2006.01)

(52) U.S. Cl.
  CPC . *H02P 9/105* (2013.01); *H02J 3/24* (2013.01); *H02J 7/32* (2013.01)

(58) Field of Classification Search
  CPC .................................................. H02P 9/105
  USPC .............. 320/123; 322/17–19, 22–25, 27, 28; 323/234
  See application file for complete search history.

(56) References Cited

U.S. PATENT DOCUMENTS

| | | | |
|---|---|---|---|
| 8,525,489 B2 * | 9/2013 | Ahn et al. | 322/24 |
| 2010/0201329 A1 * | 8/2010 | Ahn et al. | 322/28 |
| 2012/0175876 A1 * | 7/2012 | Pendray et al. | 290/41 |
| 2015/0076820 A1 * | 3/2015 | Pendray et al. | 290/41 |

* cited by examiner

*Primary Examiner* — Richard V Muralidar
(74) *Attorney, Agent, or Firm* — Jackson IPG PLLC; Demian K. Jackson

(57) ABSTRACT

An integrated generation control system includes at least one integrated control module, a rectification module, a communication module, a rectifier, a permanent magnet alternator, a generator, a maintenance module, a local control unit and a battery. The integrated control module includes an automatic voltage regulator, a power system stabilizer and an extensive gate controller. The rectification module is connected to the integrated control module. The communication module is arranged between the integrated control module and the rectification module. The rectifier is connected to the integrated control module and the rectification module. The permanent magnet alternator is connected to the rectifier. The generator is connected to the integrated control module.

6 Claims, 4 Drawing Sheets

| $K_f$ / $\dot{S}$ | NB | NS | Z | PS | PB |
|---|---|---|---|---|---|
| NB | H | H | VB | VB | PB |
| NS | VB | B | VB | VB | B |
| Z | S | VS | B | M | S |
| PS | S | N | Z | VS | VS |
| PB | B | B | B | B | VB |
| S | | | | | H |

N : Negative    Z : Zero    P : Positive    H : Huge    NS : Negative Small
NH : Negative Huge    NB : Negative Big    NM : Negative Medium    PB : Positive Big
PH : Positive Huge    PS : Positive Small    PM : Positive Medium    M : Medium
VS : Very Small    VB : Very Big    B : Big

FIG. 3

INTEGRATED GENERATION CONTROL SYSTEM

BACKGROUND OF INVENTION

1. Field of Invention

The present invention relates to an integrated generation control system and, more particularly, to an integrated generation control system for enhancing the dynamic stability of a generation system or the stability of the output from generators operated in parallel.

2. Related Prior Art

An automatic voltage regulator ("AVR") is used to control an excitation system of a synchronous generator. The excitation system is used as a DC power supply for the field windings of the synchronous generator. Within the operative capacity of the synchronous generator, the filed currents of the field windings are used to control the voltage output from the synchronous generator and the ineffective power flow. However, the damping torque of the synchronous generator is inevitably reduced by the AVR in operation. Hence, it is necessary to provide a stabilizer to provide an additional control signal to produce a positive damping torque to compensate the reduction of the damping torque for the use of the AVR. To increase the quick responses and transient changes of the voltage output from the synchronous generator, the gain is increased in the AVR. In operation, the stabilizer adjusts the transfer function of the synchronous generator and moves the limits of the transfer function to control the root locus of the synchronous generator in the half plane and expedite the attenuation of the power oscillation. Hence, there would not be any unstable oscillation and the stability of the synchronous generator is increased whatever the transient changes or responses might be.

The excitation system may be a DC, AC or static one. The stabilizer may be operated in a two-mode input model, one-mode input model or multi-band model.

A conventional analog AVR is equipped with a control card that is a single element without a backup structure. In the analog AVR, the signal is transferred by wires and processed by analog elements such as amplifiers, adders, subtracters and/or comparators. The inevitable aging of any of the analog elements would cause precision drift and the precision of the transfer of the signal would be reduced. It is difficult to correct such errors and maintain the analog AVR.

A digital AVR measures and converts an analog signal to digital signal and transfers the digital signal to a microprocessor that executes calculation on the digital signal in accordance with an algorithm. The result from the calculation may be released in a digital form or released after it is converted to an analog form. The digital AVR needs a more complicated circuit than the analog AVR. However, regarding the transfer of the signal, the digital AVR is more precise and less vulnerable to the aging than the analog AVR because the digital AVR is equipped with a checking mechanism based on check codes.

The present invention is therefore intended to obviate or at least alleviate the problems encountered in prior art.

SUMMARY OF INVENTION

It is the primary objective of the present invention to provide an integrated generation control system for enhancing the dynamic stability of a generator or the stability of the output from several generators operated in parallel.

To achieve the foregoing objective, the integrated generation control system includes at least one integrated control module, a rectification module, a communication module, a rectifier, a permanent magnet alternator, a generator, a maintenance module, a local control unit and a battery. The integrated control module includes an automatic voltage regulator, a power system stabilizer and an extensive gate controller. The rectification module is connected to the integrated control module. The communication module is arranged between the integrated control module and the rectification module. The rectifier is connected to the integrated control module and the rectification module. The permanent magnet alternator is connected to the rectifier. The generator is connected to the integrated control module.

In an aspect, the integrated control module further includes a fast output/input unit connected to the automatic voltage regulator.

In another aspect, the rectification module includes a gate driver includes a gate driver, a current sensor and a rectification display.

In another aspect, the communication module is a network communication interface.

In another aspect, the rectifier is a three-phase complementary silicon-controlled rectifier.

In another aspect, the maintenance module is a computer, a personal digital assistant or a portable communication device.

In another aspect, the integrated generation control system further includes an excitation unit arranged between the generator and the integrated control module. The battery is arranged between the excitation unit and the integrated control module.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein:

FIG. 3 shows fuzzy rules of a fuzzy-sliding filament model of the integrated generation control system shown in FIG. 1.

DETAILED DESCRIPTION OF PREFERRED EMBODIMENT

Figure 1:
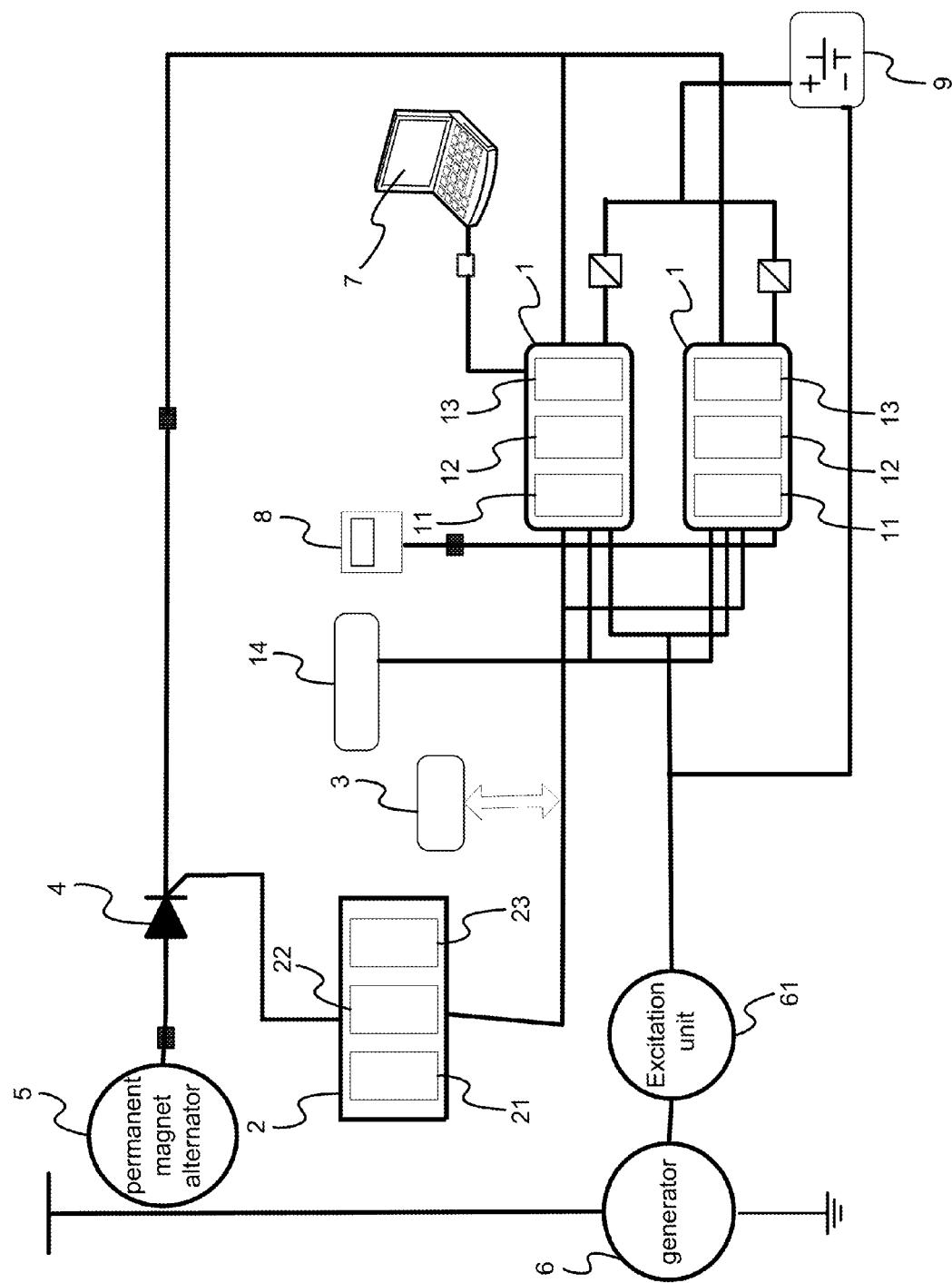
FIG. 1 is a block diagram of an integrated generation control system according to the preferred embodiment of the present invention.

Referring to FIG. 1, there is shown an integrated generation control system according to the preferred embodiment of the present invention. The integrated generation control system includes two integrated control modules 1, a rectification module 2, a communication module 3, a rectifier 4, a permanent magnet alternator 5, a generator 6, a maintenance module 7, a local control unit 8 and a battery 9.

Each of the integrated control modules 1 includes an automatic voltage regulator 11, a power system stabilizer 12 and an extensive gate controller 13. A fast output/input unit 14 is connected to both of the integrated control modules 1.

The rectification module 2 is connected to both of the integrated control modules 1. The rectification module 2 includes a gate driver 21, a current sensor 22 and a rectification display 23.

The communication module 3 is arranged between the rectification module 2 and both of the integrated control modules 1. The communication module 3 may be a network communication interface.

The rectifier 4 is connected to both of the integrated control modules 1, the rectification module 2 and the permanent magnet alternator 5. The rectifier 4 may be a three-phase complementary silicon-controlled rectifier.

The generator 6 is connected to both of the integrated control modules 1. An excitation unit 61 is arranged between the generator 6 and both of the integrated control modules 1.

The maintenance module 7 is connected to both of the integrated control modules 1. The maintenance module 7 may be a computer, a personal digital assistant ("FDA") or a portable communication device.

The local control unit 8 is connected to both of the integrated control modules 1.

The battery 9 is arranged between the excitation unit 61 and both of the integrated control modules 1.

In operation, the automatic voltage regulators 11 of the integrated control modules 1 together execute automatic voltage regulation, limitation and protection. Specific chips are used for exchange and storage of data, control over production of pulses, and A/D and D/A conversion. The automatic voltage regulators 11 and the communication module 3 together form an interface with other devices, and provide serial-port communication and watchdog diagnosis.

In the communication module 3, the node addresses and control unit parameters for example are set by manually operating jumpers and switches. Via the communication module 3, the automatic voltage regulators 11 regulate parameters related to rectification in the rectification module 2.

The rectification module 2 is a distributed control and regulation device. Via the gate driver 21, the rectification module 2 pre-processes trigger control pulses in the rectifier 4, and ensures even flows between several rectifiers operated in parallel. By adjusting the parameters of each element and individually shifting the phase of each trigger pulse for leg current symmetrical regulator. Moreover, the rectification module 2 isolates both of the integrated control modules 1 from the trigger pulses of the gate driver 21, measures data of a current in the rectifier 4, and transfers the data of the current to the rectification display 23 on which the data of the current are shown.

As discussed above, the automatic voltage regulator 11 at least executes the following functions:
1. Control over the temperature of a rotor in the generator 6 and detection of troubles such as monitoring of failures, measurement of a stable-voltage power supply, self-recovery, and comparison of detected signals of hardware with one another;
2. Over-current protection and loss-of-excitation protection such as actual power/virtual power protection;
3. Limitation such as under-excitation, over-excitation and voltage/frequency limitation;
4. Self-diagnosis such as software and hardware watchdog functions;

The power system stabilizer 12 may include a digital signal processor to execute multi-functional measurement for fast processing of measured values, electric isolation and exchange of signals. All of the measured values are sampled by an A/D converter and the digital signal processor, and stored in a synchronous dual-port RAM. Being a standard software function for a power system stabilizer, the power system stabilizer 12 introduces an additional feedback signal of acceleration power to reduce the low-frequency oscillation of the generator 6, thus increasing the stability of the grid. As discussed above, the power system stabilizer 12 exhibits at least the following functions:
1. Measurement and calculation of the current and voltage, effective and ineffective power, power factor and frequency in the generator 6 for acceleration of power;
2. Compliance of angular frequency of the rotor with a model control algorithm of an IEEE power system regulator; and
3. Measurement of high-impedance voltage without electric isolation.

The extensive gate controller 13 is used as a backup channel in a single-channel layout. The extensive gate controller 13 produces pulses for controlling a current in an excitation system as field regulation backup. Via a high-frequency pilot exciter, the extensive gate controller 13 may provide a high-frequency power supply for regulating excitation for forming pulses. The extensive gate controller 13 may be connected to the automatic voltage regulator 11 and the power system stabilizer 12. As discussed above, the extensive gate controller 13 at least executes the following functions:
1. Field current regulation and follow-up control to ensure stable switch of the automatic voltage regulator 11 in case of failure;
2. Back-up transient over-current and inverse time current-limiting protection.
3. Built-in self-sufficient power supply and DC short-circuit protection;
4. Monitoring of a gate flow rectifier and duo-rectifier switch; and
5. Independent power system and production of high-frequency pulses.

The maintenance module 7 is a very convenient tool connected to the AVR control module through optical fibers and communication cards. With the maintenance module 7, parameters are set for the automatic voltage regulator 11, and the automatic voltage regulator 11 is debugged and maintained. By manually operating the jumpers and switches, the node addresses of the communication module 3 are set, and so is the extensive gate controller 13. As discussed above, the maintenance module 7 at least executes the following functions:
1. Monitoring of the status values of the automatic voltage regulators 11 via a machine/human interface;
2. Adjustment and modification of related parameters;
3. Check on and display of an internal record of data and deletion of a record of failures;
4. Reservation of current setting and registration of patterns; and
5. On-site control over the automatic voltage regulator 11.

In the digital automatic voltage regulator 11, a digital modularization technique is used for an excitation system. The automatic voltage regulator 11 is used to execute various control over and regulation of the production of the pulses. As the core of the control circuit, the power system stabilizer 12 is used for fast interception of the measured values. The digital automatic voltage regulator 11 and the power system stabilizer 12 together form an independent control channel. In a dual system design, there are two control channels mechanically isolated from each other for convenient on-line maintenance of the maintenance module 7. Each control channel may control several extensive gate controllers 13. The communication module 3 and the fast output/input unit 14 together satisfy non-urgent needs. The extensive gate controllers 13 are mechanically separated from the control channels for filed regulation backup.

The present invention provides an excitation control model. Variables related to its fuzzy sliding-mode controller model are defined as follows:

$$x_1(t)=\Delta\omega_r(t) \quad (1)$$

$$\dot{x}_1(t)=-\dot{\omega}_r(t)=-x_2(t) \quad (2)$$

wherein $\Delta\omega_r$ stands for a differential of the angular speed of the rotor of the generator, and $\omega_r$ stands for the angular speed of the rotor of the generator.

The stable-status power output from the generator is defined as follows:

$$\begin{bmatrix} \dot{x}_1(t) \\ \dot{x}_2(t) \end{bmatrix} = \begin{bmatrix} 0 & -1 \\ 0 & -B/J \end{bmatrix}\begin{bmatrix} x_1(t) \\ x_2(t) \end{bmatrix} + \begin{bmatrix} 0 \\ -K_t/J \end{bmatrix}\dot{i}_q^*(t) + \begin{bmatrix} 0 \\ 1/J \end{bmatrix}\dot{T}_m \quad (3)$$

wherein J stands for the rotational inertia, $T_m$ stands for the mechanical torque, and B stands for the frictional coefficient of the generator.

Formula (3) may be rewritten as follows:

$$\dot{X}(t)=AX(t)+BU(t)+D\dot{T} \quad (4)$$

In consideration of interference, the formal may be expressed as follows:

$$\dot{X}(t)=(A+\Delta A)X(t)+(B+\Delta B)U(t)+(D+\Delta D)\dot{T}_m \quad (5)$$

wherein $\Delta A$, $\Delta B$ and $\Delta D$ can be expressed by parameters such as J, B, Kt and Tm. Formula (5) can be rewritten as follows:

$$\dot{X}(t)=AX(t)+B(U(t)+F(t)) \quad (6)$$

F(t) stands for the lumped factor and can be expressed as follows:

$$F(t)=B^{-1}\Delta AX(t)+B^{-1}\Delta BU(t)+B^{-1}(D+\Delta D)\dot{T}_m \quad (7)$$

According to formula (7), the switch interface of the overall operation can be achieved by the system parameters A and B.

1. A Switch Plane Design:
A switch plane of a sliding-mode controller that includes an integration can be designed as follows:

$$S(t)=C[X(t)-\int_0^t(A+BK)X(\tau)d\tau]=0 \quad (8)$$

wherein C is a positive matrix, and K is a status feedback gain matrix. It can be learned from the switch plane (8) of the sliding-mode controller that if the system status trajectory (6) reaches the switch plane, i.e., $S(t)=\dot{S}(t)=0$, the equivalent dynamic status of the system is determined as follows:

$$\dot{X}(t)=(A+BK)X(t) \quad (9)$$

Obviously, if the limit of the system (9) is placed in the left half plane, the differential of the angular speed of the rotor will reach zero like a convergent exponent. Therefore, there will not be any overshoot of the follow-up response, and the dynamic status of the system is like a status feedback control system.

2. Controller Design:
Based on the switching surface, a switching control law which satisfies the hitting condition and guarantees the existence of the sliding mode is then designed. The sliding-mode rotational speed controller is defined as follows:

$$U(t)=KX(t)-f\,\text{sgn}(S(t)) \quad (10)$$

wherein sgn( ) stands for a signum function and is defined as follows:

$$\text{sgn}(S(t)) = \begin{cases} +1 & \text{if } S(t)>0 \\ -1 & \text{if } S(t)<0 \end{cases} \quad (11)$$

f is defined by $|F(t)|\le f$
wherein F(t) stands the switch plane for the overall operation and is defined as follows:

$$F(t)=B^{-1}\Delta AX(t)+B^{-1}\Delta BU(t)+B^{-1}(D+\Delta D)\dot{T}_m$$

3. Fuzzy-Sliding Controller:
In a sliding-mode controller, an upper limit of an unknown term such as parameter variation and external interference with the load must be known. It is however difficult to obtain the boundaries of an unknown item in practice. Hence, a fuzzy-sliding controller is disclosed according to the present invention. A fuzzy inference mechanism is used to estimate the upper limit of an unknown item. The fuzzy inference mechanism can build an estimation model for the unknown item. In comparison with a conventional estimation device, the fuzzy inference mechanism, in which expert knowledge is used, is effective.

$K_f$ is used to replace f in formula (10) as follows:

$$U(t)=KX(t)-K_f\text{sgn}(S(t)) \quad (11)$$

Figure 2:
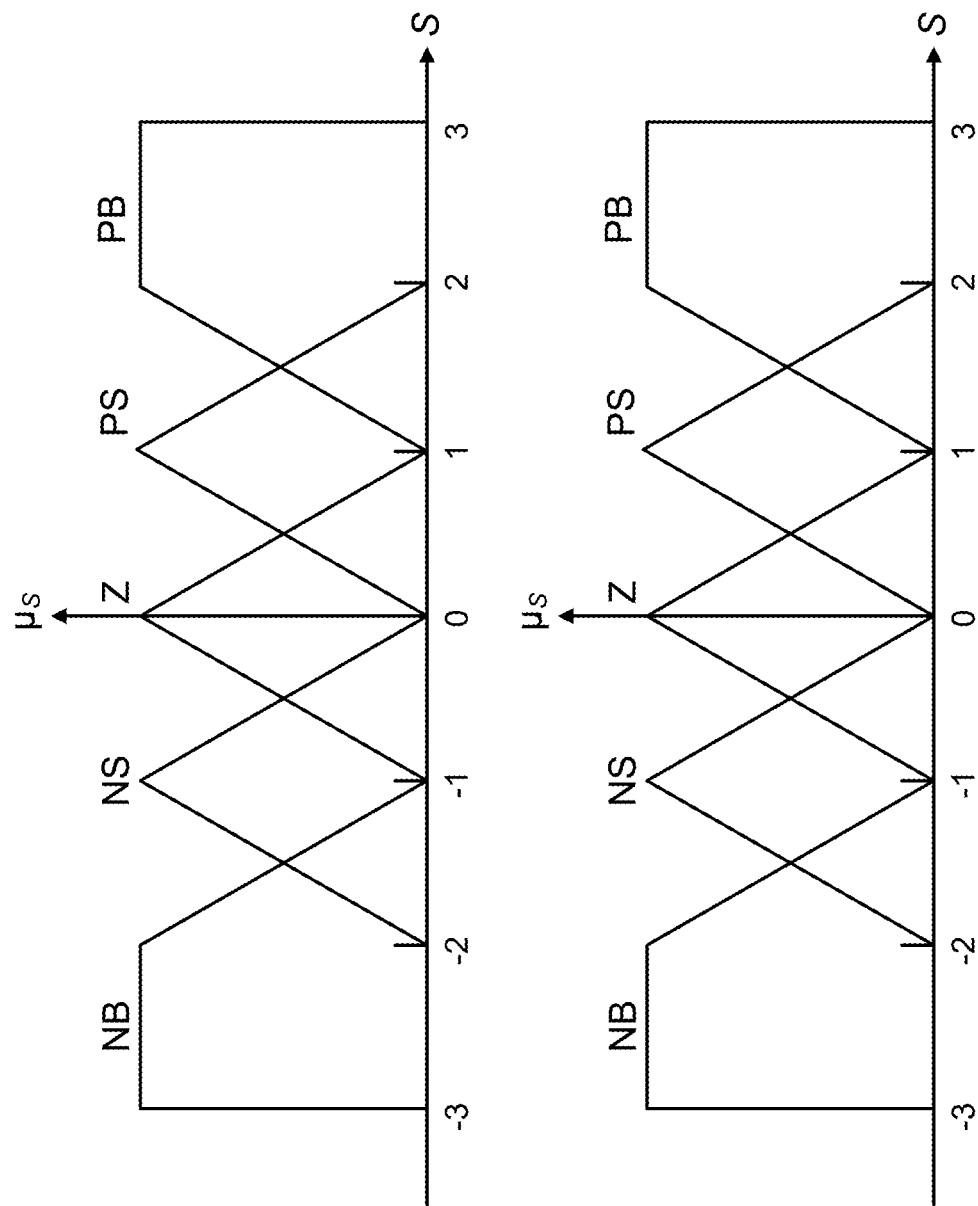
FIG. 2 shows a switch switch plane S and a switch switch plane differential $\dot{S}$ of the integrated generation control system shown in FIG. 1.

$K_f$ is estimated by the fuzzy inference mechanism. Please refer to FIG. 2, which are diagrams showing membership functions for the fuzzy sets corresponding to switching surface S, $\dot{S}$. In the fuzzy inference mechanism, the processing of the data is based on the fuzzy set theory. Hence, the fuzzy set includes fuzzy control rules. To obtain the $K_f$ output function, the center of gravity ("COG") is used to calculate the output from the fuzzy inference mechanism as follows:

$$K_f = \frac{\sum_{i=1}^{25} w_i c_i}{\sum_{i=1}^{25} w_i} = [c_1 \; \ldots \; c_{25}]\begin{bmatrix} w_1 \\ \vdots \\ w_{25} \end{bmatrix} \Big/ \sum_{i=1}^{25} w_i = v^T W \quad (12)$$

wherein $w_i$ stands for a fired strength vector, $c_i$ stands for the central value of the membership function of $K_f$.

Because there fuzzy subsets N, Z and P are defined as S and $\dot{S}$, the fuzzy inference method includes 25 rules as shown in FIG. 3.

The power system stabilizer 12 feeds the system frequency variation or effective power variation back to the excitation system to compensate the insufficient impedance in the high-speed excitation system after the quick responses. To avoid reduction of the synchronous torque, the power system stabilizer 12 is made in an under-compensated design to increase the impedance in the generator and the dynamic stability of the system and enhance the synchronous torque in the transient stability of the generator.

Figure 4:
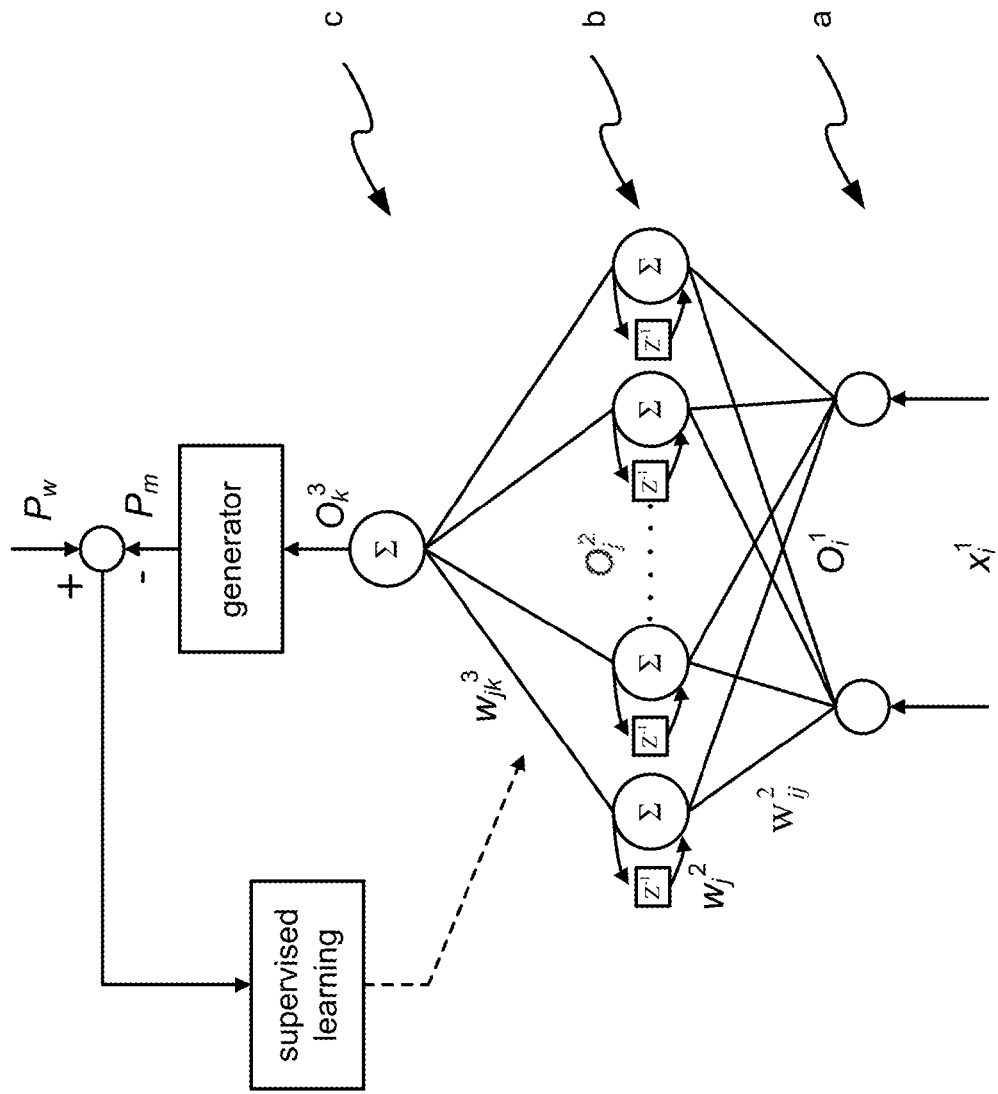
FIG. 4 is a block diagram of a recurrent neural network of the integrated generation control system shown in FIG. 1.

The power system stabilization device is synchronized with an on-line training model. There is provided a 3-level recurrent neural network ("RNN") as shown in FIG. 4. The RNN is used for tracking the output power of the power system. The RNN is adaptive and suitable for use in a non-linear system. The RNN includes an input layer a, a hidden layer b and an output layer c.

For the $i^{th}$ neuron in the input layer, the input and output are defined as follows:

$$net_i^1(N) = x_i^1(N) \quad (13)$$

$$O_i^1(N) = f_i^1(net_i^1(N)) = \frac{1}{1+e^{-net_i^1(N)}}, \quad (14)$$

$$i = 1, 2$$

wherein $x_i^1$ is the input signal on the input layer a, in the form of voltage, current or temperature, N stands for the iteration number of the neutral network, and $O_i^1$ stands for the output on the input layer.

Regarding the hidden layer b, when the data are entered to the network, the input vector is transferred into every function in the hidden layer b from the input layer a. That is, after the distance of the input vector from the center of each neutron is calculated, the function is transferred into the output from each neutron on the hidden layer b. The output and input are defined as follows:

$$net_j^2(N) = w_j^2 O_j^2(N-1) + \sum_i w_{ij}^2 x_i^2(N) \quad (15)$$

$$O_j^2 = f_j^2(net_j^2(N)) = \frac{1}{1+e^{-net_j^2(N)}}, \quad j = 1, \ldots, n \quad (16)$$

wherein n stands for the neutron.

Regarding the output layer c, each neutron is labeled by Σ. That is, all signals introduced into this neutron are added up. For the $O^{th}$ neutron on the output layer, the input and output are defined as follows:

$$net_k^3(N) = \sum_j w_{jk}^3 x_j^3(N) \quad (17)$$

$$O_k^3(N) = f_k^3(net_k^3(N)) = net_k^3, \quad k = 1 \quad (18)$$

wherein $O_k^3(N)$ stands for the output from the network and is the reference voltage of the output power, and $w_{jk}^3$ stands the weight of the $j^{th}$ neutron on the hidden layer b.

Regarding the supervised learning and training procedure, recurrent chain rules are used to calculate the error on each layer. The errors are sued to modify the weights. To describe the on-line learning rule, an error function E is defined as follows:

$$E = \frac{1}{2}(P_w - P_m)^2 = \frac{1}{2}e_m^2 \quad (19)$$

wherein $P_w$ stands for the expected output power, $P_m$ stands for the actual output power, and $e_m$ stands for the error.

A learning algorithm based on a reverse-recurrent algorithm is defined as follows:

For the output layer c, $w_{jk}^3$ is updated.

The reverse-recurrent error is defined as follows:

$$\delta_k = -\frac{\partial E}{\partial O_k^3} = \left[-\frac{\partial E}{\partial e_m}\frac{\partial e_m}{\partial O_k^3}\right] \quad (20)$$

The connective weight between the output layer c and the hidden layer b is defined as follows:

$$\Delta w_{jk}^3 = -\frac{\partial E}{\partial w_{jk}^3} = \left[-\frac{\partial E}{\partial O_k^3}\frac{\partial O_k^3}{\partial net_k^3}\right] = \delta_k O_j^2 \quad (21)$$

The connective weight between the output layer c and the hidden layer b is modulated as follows:

$$w_{jk}^3(N+1) = w_{jk}^3(N) + \eta_{jk}\Delta w_{jk}^3(N) \quad (22)$$

wherein $\eta_{jk}$ stands for the learning speed of the connective weight between the output layer c and the hidden layer b.

For the hidden layer b, $w_j^2$ and $w_{ij}^2$, connective weights $\Delta w_j^2$ and $\Delta w_{ij}^2$ are updated as follows:

$$\Delta w_j^2 = -\frac{\partial E}{\partial w_j^2} = \left[-\frac{\partial E}{\partial O_k^3}\frac{\partial O_k^3}{\partial O_j^2}\frac{\partial O_j^2}{\partial w_j^2}\right] = \delta_k w_{jk}^2 P_j^2 \quad (23)$$

$$\Delta w_{ij}^2 = -\frac{\partial E}{\partial w_{ij}^2} = \left[-\frac{\partial E}{\partial O_k^3}\frac{\partial O_k^3}{\partial O_j^2}\frac{\partial O_j^2}{\partial w_{ij}^2}\right] = \delta_k w_{jk}^3 Q_{ij}^2 \quad (24)$$

For the hidden layer, the modifications are defined as follows:

$$w_j^2(N+1) = w_j^2(N) + \eta_j \Delta w_j^2(N) \quad (25)$$

$$w_{ij}^2(N+1) = w_{ij}^2(k) + \eta_{ij}\Delta w_{ij}^2(N) \quad (26)$$

wherein $\eta_j$ and $\eta_{jk}$ stand for the learning speeds of the connective weights $w_j^2$ and $w_{ij}^2$ between the output layer c and the hidden layer b.

As discussed above, the integrated control module 1, in the regulation by the power system stabilizer 12, the rotational-speed error, power error and/or frequency error are used as the additional control signals, and the additional feedback signal is introduced to suppress the low-frequency oscillation of the synchronous generator and increase the impedance against the electromechanical oscillation in the power system to enhance the dynamic stability in the power system. In general, the automatic voltage regulator 11 exhibits a high gain for the quick response. The high-gain automatic voltage regulator 11 reduces the impedance against the electromechanical oscillation in the power system. Hence, when a transient status occurs in the power system or a failure occurs in the power grid to interfere with the power system, a proper power system stabilizer 12 is generally used to improve the stability in the transient status to avoid any influence on the quick response of the automatic voltage regulator 11 or to quickly stabilize the generator or power system. However, the power system stabilizer 12 advances or delays the phase of the function of the system to change the transfer function of the system. That is, the limits of the function of the system are moved so that the entire root trajectory of the generator is controlled to be in the left half plane, and the impedance in any transient status of the system is compensated, and unstable oscillation is prevented. Hence, the automatic voltage regulator 11 and the system stabilizer 12 cannot only be used in an excitation system to stabilize the power output from a generator but can also be used to stabilize the output from many generators operated in parallel.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. An integrated generation control system including:

two integrated control modules connected in parallel, each module 1 including an automatic voltage regulator 11, a power system stabilizer 12 and an extensive gate controller 13;

a rectification module 2 connected to both of the integrated control modules;

a communication module 3 arranged between both of the integrated control modules and the rectification module 2;

a rectifier 4 connected to both of the integrated control modules and the rectification module 2;

a permanent magnet alternator 5 connected to the rectifier 4;

a generator 6 connected to both of the integrated control modules;

a maintenance module 7 connected to both of the integrated control modules;

a local control unit 8 connected to both of the integrated control modules;

a fast output/input unit connected to the automatic voltage regulator of each integrated control module; and a battery 9 connected to both of the integrated control modules.

2. The integrated generation control system according to claim 1, wherein the rectification module 2 includes a gate driver 21, a current sensor 22 and a display 23.

3. The integrated generation control system according to claim 1, wherein the communication module 3 is a network communication interface.

4. The integrated generation control system according to claim 1, wherein the rectifier 4 is a three-phase complementary silicon-controlled rectifier.

5. The integrated generation control system according to claim 1, wherein the maintenance module 7 is selected from the group consisting of a computer, a personal digital assistant and a portable communication device.

6. The integrated generation control system according to claim 1, further including an excitation unit 61 arranged between the generator 6 and both of the integrated control modules, wherein the battery connects between the excitation unit 61 and both of the integrated control modules.

* * * * *